US011388354B2

(12) United States Patent
Karabed (10) Patent No.: US 11,388,354 B2
(45) Date of Patent: Jul. 12, 2022

(54) BACKUP-CAMERA-SYSTEM-BASED, ON-DEMAND VIDEO PLAYER

(71) Applicant: Razmik Karabed, Brentwood, CA (US)

(72) Inventor: Razmik Karabed, Brentwood, CA (US)

(*) Notice: Subject to any disclaimer, the term of this patent is extended or adjusted under 35 U.S.C. 154(b) by 0 days.

(21) Appl. No.: 17/128,115

(22) Filed: Dec. 20, 2020

(65) Prior Publication Data
US 2021/0185240 A1    Jun. 17, 2021

Related U.S. Application Data

(60) Provisional application No. 62/944,772, filed on Dec. 6, 2019.

(51) Int. Cl.
*H04N 7/18* (2006.01)
*H04N 5/268* (2006.01)
(Continued)

(52) U.S. Cl.
CPC .............. *H04N 5/268* (2013.01); *B60R 1/00* (2013.01); *G06F 3/0488* (2013.01); *G06F 13/20* (2013.01); *G06V 20/597* (2022.01); *G06V 40/161* (2022.01); *G06V 40/20* (2022.01); *H04N 5/23216* (2013.01); *H04N 5/23219* (2013.01); *H04N 5/247* (2013.01); *H04N 7/18* (2013.01); *B60R 2300/105* (2013.01); *B60R 2300/8046* (2013.01); *G10L 15/22* (2013.01)

(58) Field of Classification Search
None
See application file for complete search history.

(56) References Cited

U.S. PATENT DOCUMENTS 6,549,641 B2   4/2003   Ishikawa et al.
8,549,415 B2   10/2013  Tang
(Continued)

FOREIGN PATENT DOCUMENTS

EP            2421275        2/2012
JP            2011188028     9/2011
WO   PCT/US2017/047594      8/2017

OTHER PUBLICATIONS

Portions of prosecution history of U.S. Appl. No. 15/277,637, filed Mar. 21, 2019, Karabed, Razmik.
(Continued)

*Primary Examiner* — Eileen M Adams
(74) *Attorney, Agent, or Firm* — Makoui Law, PC; Ali Makoui (57) ABSTRACT

A backup-camera-system-based, on-demand video player includes at least one video signal input port, driver interface means operable to receive from a driver information about the driver's selection of a video signal input port from the at least one video signal input port, and a controller operable to receive the information from the driver interface means, determining the video signal input port selected by the driver, making a connection between the video signal input port to a back-camera input port of a backup camera system, and sending a reverse gear engaged signal to a reverse gear port of the backup camera system. The drive accesses a video signal connected to the selected video signal port on a display monitor of the backup camera system.

10 Claims, 6 Drawing Sheets

(51) Int. Cl.

| | |
|---|---|
| *H04N 5/232* | (2006.01) |
| *G06F 3/0488* | (2022.01) |
| *H04N 5/247* | (2006.01) |
| *G06F 13/20* | (2006.01) |
| *B60R 1/00* | (2022.01) |
| *G06V 20/59* | (2022.01) |
| *G06V 40/20* | (2022.01) |
| *G06V 40/16* | (2022.01) |
| *G10L 15/22* | (2006.01) |

(56) References Cited

U.S. PATENT DOCUMENTS

| | | |
|---|---|---|
| 8,643,703 B1 | 2/2014 | Karakotsios et al. |
| 8,797,263 B2 | 8/2014 | Kim |
| 8,926,475 B2 | 1/2015 | Lin et al. |
| 9,092,053 B2 | 7/2015 | Kerr et al. |
| 9,167,289 B2 | 10/2015 | Stinson et al. |
| 9,223,400 B2 | 12/2015 | Lin et al. |
| 9,224,060 B1 | 12/2015 | Ramaswamy |
| 9,274,597 B1 | 3/2016 | Karakotsios et al. |
| 9,285,883 B2 | 3/2016 | Bi et al. |
| 9,787,939 B1 | 10/2017 | Beguin et al. |
| 10,654,422 B2 | 5/2020 | Karabed |
| 2002/0124260 A1 | 9/2002 | Rivera |
| 2004/0239687 A1 | 12/2004 | Idesawa et al. |
| 2008/0052638 A1 | 2/2008 | Frank et al. |
| 2008/0088624 A1 | 4/2008 | Long et al. |
| 2008/0225123 A1 | 9/2008 | Osann et al. |
| 2009/0051699 A1 | 2/2009 | Posa et al. |
| 2009/0059023 A1 | 3/2009 | Sasaki |
| 2009/0313584 A1 | 12/2009 | Kerr et al. |
| 2010/0171691 A1 | 7/2010 | Cook et al. |
| 2011/0090149 A1 | 4/2011 | Larsen et al. |
| 2011/0140919 A1 | 6/2011 | Hara et al. |
| 2012/0229616 A1 | 9/2012 | Koike et al. |
| 2013/0100123 A1 | 4/2013 | Hakoda et al. |
| 2013/0229482 A1 | 9/2013 | Vilcovsky et al. |
| 2013/0314581 A1 | 11/2013 | Kido |
| 2014/0226000 A1 | 8/2014 | Vilcovsky et al. |
| 2014/0293057 A1 | 10/2014 | Wierich |
| 2015/0070742 A1 | 3/2015 | Sorek et al. |
| 2015/0154439 A1 | 6/2015 | Anzue et al. |
| 2015/0241961 A1 | 8/2015 | Morris et al. |
| 2015/0332090 A1 | 11/2015 | Kumamoto |
| 2016/0085301 A1 | 3/2016 | Lopez |
| 2016/0142685 A1* | 5/2016 | Aoki ............... H04N 5/23293 348/148 |
| 2016/0156838 A1 | 6/2016 | Cheng et al. |
| 2016/0257252 A1 | 9/2016 | Zaitsev et al. |
| 2016/0280136 A1 | 9/2016 | Besson |
| 2016/0288717 A1 | 10/2016 | Kameshima et al. |
| 2017/0053191 A1 | 2/2017 | Koyama |
| 2017/0053456 A1 | 2/2017 | Cho et al. |
| 2017/0140227 A1 | 5/2017 | Takemura et al. |
| 2017/0282796 A1 | 10/2017 | Kosaki |
| 2017/0310906 A1 | 10/2017 | Onaka |
| 2018/0060685 A1 | 3/2018 | Karabed |
| 2018/0063444 A1 | 3/2018 | Karabed |
| 2019/0146494 A1* | 5/2019 | Li ............... B62D 63/02 701/23 |
| 2021/0155167 A1* | 5/2021 | Lynam ............... G08G 1/168 |

OTHER PUBLICATIONS

Portions of prosecution history of U.S. Appl. No. 15/388,856, filed Jun. 27, 2019, Karabed, Razmik.

Portions of prosecution history of U.S. Appl. No. 15/854,558, filed Apr. 29, 2020, Karabed, Razmik.

International Search Report and Written Opinion of PCT/US2017/047594, dated Oct. 27, 2017, Karabed, Razmik.

* cited by examiner

BACKUP-CAMERA-SYSTEM-BASED, ON-DEMAND VIDEO PLAYER

CROSS-REFERENCE TO RELATED APPLICATIONS

This application claims the benefit of priority to U.S. provisional patent application No. 62/944,772, filed Dec. 6, 2019, the contents of which are herein incorporated by reference.

FIELD OF INVENTION

This invention relates to existing backup camera systems, more specifically relates to upgrading existing backup camera systems to have on-demand views. Further, this invention relates to existing backup camera system accessories that enable on-demand view of one or more cameras.

BACKGROUND OF THE INVENTION

Car owners install backup camera systems to increase their view toward rear of the car. Of course, the U.S. National Highway Traffic Safety Administration has required all automobiles sold in the United States built beginning in May 2018 to include backup camera system.

A major cause of accidents is lack of surveillance. To inspect objects toward rear of the car, there is a need to access the rear-view even when the car is not in reverse gear. Most backup camera systems turn on when the car is in reverse gear and they turn off when the car is not in reverse gear. It is desirable to access the rear-view on demand.

Additionally, there is need to access one or more other views on demand, for example, a view to the front, a view toward the right-side or left-side of the car.

Currently, in order to have access to multi-camera views on-demand, the owner of a car is forced to replace the existing system with a more expensive one.

A list of backup camera aftermarket systems is: Kenwood, Pioneer, Sony, JVC, etc.

And there is no solution that would enhance the performance of an existing system.

SUMMARY OF THE INVENTION

As stated above there is a need to upgrade existing backup camera systems to have on-demand views.

This disclosure offers a robust solution that can be added to most backup camera systems.

A backup-camera-system-based (BCSB), on-demand video player augments the functionality of existing backup camera systems to include on-demand view of one or more camera views.

Figure 1:
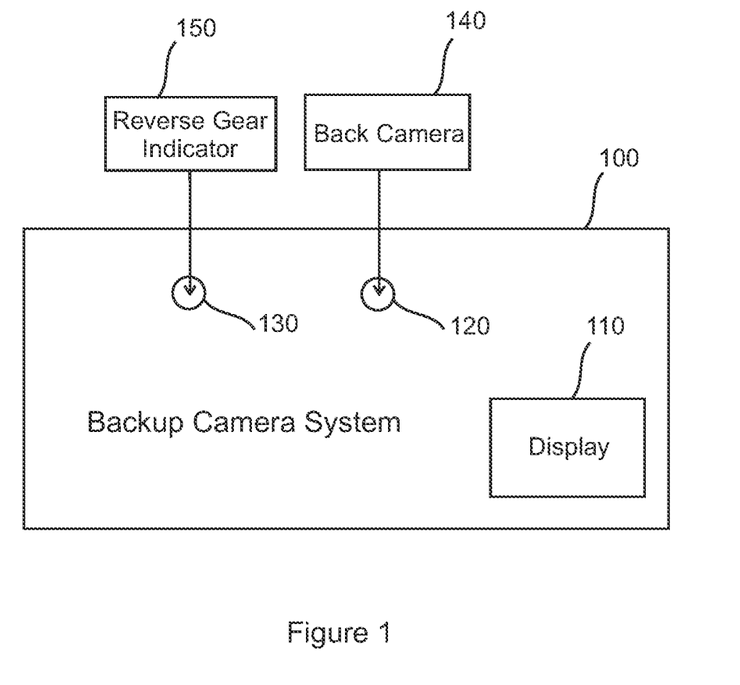
FIG. 1 illustrates a typical backup camera system.

Referring to FIG. 1, a backup camera system 100 is shown. The backup camera system 100 includes a display monitor 110, a back-camera input port 120, and a signal input port 130.

A back-camera 140 is connected to the input port 120, and a reverse gear indicator 150 is connected the signal input port 130.

The reverse gear indicator 150 shows whether the car is in reverse gear or not. Typically, a 12 dc volts signal is used to indicate the car is in reverse gear and a 0 dc volts (ground) signal is used to indicate that it is not in reverse gear.

The backup camera system 100 displays the view of the back-camera 140 on the display monitor 110 when the reverse gear indicator 150 is 12 volts. And it stops the display when the reverse gear indicator is 0 volts.

The BCSB, on-demand video player is explained next.

In brief, once a BCSB, on-demand video player is added to the existing backup camera system 100, the driver can access the views of one or more cameras on-demand.

The simple form of the BCSB, on-demand video player offers the view of the back-camera 140 on-demand. In this form, the BCSB, on-demand video player takes control of the reverse gear indicator 150 signal input port 130 of the backup camera system 100. In responds to the driver's demand to access the back-camera 140 view, the BCSB, on-demand video player sends a 12 volts signal to the signal input port 130.

The complex form of the BCSB, on-demand video player is connected to a plurality of cameras and it offers the view of each of the cameras from the plurality of cameras, on-demand. In this form, the BCSB, on-demand video player not only takes control of the signal input port 130 but also the back-camera input port 120 by first disconnecting the back-camera 140 from the backup camera system 100. When the driver selects a camera from the plurality of cameras and demands the view of the selected camera, the BCSB, on-demand video player performs the following tasks: it sends a 12 volts signal to the signal input port 130 and it sends the video signal of the selected camera to the back-camera input port 120.

We remark that the back-camera 140 can be one of the plurality of cameras.

Interface:

(2 Cameras; Driver Facing Camera; Head Movements)

In one aspect of the B, a driver facing camera is used to interface with the driver. The driver communicates his demands using his head movements. In one example, the BCSB, on-demand video player offers the views of 2 cameras: the back-camera 140 and a right-side camera. The driver accesses the right-side camera view by slightly moving her/his head to her/his right-side; and the driver accesses the back-camera view by slightly moving her/his head to the her/his left-side. Thus the driver accesses two camera views on-demand.

(3 Cameras; Driver Facing Camera; Head Movements)

In another example, the BCSB, on-demand video player offers the views of 3 cameras: the back-camera 140, a right-side camera, and a left-side camera. The view on the display monitor 110 can be changed from the left-side camera view to the back-camera view and from the back-camera view to the right-side camera view each by a slight head move to the right-side. And the view on the display monitor 110 can be changed from the right-side camera view to the back-camera view and from the back-camera view to the left-side camera view each by a slight head move to the left-side.

Thus, the driver accesses three camera views on-demand.

Further the BCSB, on-demand video player accommodates differing left-side and right side moves to please the divers' preferences.

(3 Cameras; Driver Facing Camera; Hand Gestures)

In yet another example, the BCSB, on-demand video player offers the views of 3 cameras: the back-camera 140, the right-side camera, and the left-side camera. And the driver accesses the views of the right-side camera, the back-camera 140, and the left-side camera by making hand gestures pointing toward her/his right-side, top, and left-side, respectively. Thus, the driver accesses three camera views on-demand.

(2 Cameras; Microphone; Voice Commands)

In another aspect of the B, a microphone is used to interface with the driver. The driver communicates her/his demands using voice command. In one example, the BCSB, on-demand video player offers the views of 2 cameras: the back-camera 140 and a right-side camera. The driver accesses the right-side camera view by 'right' voice command, and the driver accesses the back-camera 140 view by 'back' voice command.

(2 Cameras; Touchscreen; Touch Commands)

In another aspect of the B, a touchscreen is used to interface with the driver. The driver communicates her/his demands using touchscreen commands. In one example, the BCSB, on-demand video player offers the views of 2 cameras: the back-camera 140 and a right-side camera. The driver accesses the right-side camera view by touching the right-side of the touchscreen, and the driver accesses the back-camera 140 view by touching the left-side of the touchscreen.

In yet another aspect of the B, a manual switch is used to interface with the driver. The driver communicates his demands by placing the switch in different positions. One position can correspond to the back-camera 140, etc.

More specifically, the BCSB, on-demand video player comprises one or more video signal input ports. Each video signal input port can be connected to a video signal source such as a camera.

The BCSB, on-demand video player further comprises a controller means and a driver interface means.

The driver makes a selection among the video signal input ports, desiring to view the source connected to it.

He/she communicates his/her selection to the driver interface means.

The driver interface means sends information regarding the driver's selection to the controller of the B.

(Driver Facing Camera)

In one aspect of the B, the driver interface means is a driver facing camera, and the information from the driver's interface means to the controller is via a sequence of images generated by the camera driver facing camera.

In this aspect, the controller performs face detection and tracking on the sequence of images received from the driver facing camera, and determines the video signal input port selected by the driver based on the movements and gestures of the driver.

In one case, slight head movement to the right-side and to left-side are predetermined to comprise the communication codebook for the driver. A slight head move to the right-side denotes driver's selection of one of the video signal input ports, and a slight head move to the left-side denotes driver's selection of another of the video signal input ports.

In another case, a hand motion to right-side, left-side and up are predetermined to comprise the communication codebook for the driver. A hand motion to the right-side denotes driver's selection of one of the video signal input ports, etc.

In yet another case, the communication codebook is a set having hand gestures with 1-5 fingers. This codebook is used to identify 5 individual video signal input ports.

Once the controller determines the driver's selection it performs the following tasks. It makes a connection between the video signal input port selected by the driver to the back-camera 140 input port 120 of the backup camera system 100, and it sends a reverse gear engaged (12 volts) signal to the signal input port 130 of the backup camera system 100.

By sending the reverse gear engaged signal to the signal input port 130, the controller takes control of the display monitor 110 of the backup camera system 100, and by connecting the video signal input port selected by the driver to the back-camera 140 input port 120, it causes the backup camera system 100 to show the video signal of the video signal source (camera in this case) connected to the selected video signal port on the display monitor 110. Therefore, the BCSB, on-demand video player enables the driver to have on-demand view of the video sources connected to the video signal ports.

(Mux and Processor)

In one aspect, the connections of the video signal input port to the input port 120 is made using a multiplexer. The multiplexer has a plurality of video signal input ports, a video signal output port, and a control port. Here the multiplexer video signal input ports and the video signal ports of the BCSB, on-demand video player are the same. The multiplexer video signal output port is connected to the input port 120 of the backup camera system 100, and the controller is connected to the control port of the multiplexer. The controller operated the multiplexer by sending control signals to the control port of the multiplexer. The multiplexer connected one of its input ports to its output port based on the control signal it receives.

Examples for the multiplexer are analog multiplexers, MC14051B, MC14052B, and MC14053B, which are digitally-controlled analog switches by Motorola. Also a multi-throw relay can be used in some designs.

In another aspect, the connections of the video signal input port to the input port 120 is made directly by the controller. Here the video signal input ports part of the controller. And the controller has direct access to the video signal ports. Therefore, the controller makes the connection internally.

(Microphone)

In another aspect of the B, the driver interface means is a microphone, and the information between the driver interface means and the controller is via an audio signal generated by the microphone.

In this aspect, the controller performs voice detection on the audio signal received from the microphone, and determines the video signal input port that is selected by the driver based on the driver's voice commands.

In one case, phrases: 'left camera', 'right camera', and 'back camera' are predetermined to comprise the communication codebook for the driver. A voice command 'left camera' denotes driver's selection of one of the video signal input ports connected to a camera on the left-side of the car, a voice command 'right camera' denotes driver's selection of one of the video signal input ports connected to a camera on the right-side of the car, and a voice command 'back camera' denotes driver's selection of one of the video signal input ports connected to a camera facing toward rear of the car Again, once the controller determines the driver's selection it performs the following tasks. It makes a connection between the video signal input port selected by the driver to the back-camera 140 input port 120 of the backup camera system 100, and it sends a reverse gear engaged signal to the reverse gear port 130 of the backup camera system 100.

Therefore, the BCSB, on-demand video player enables the driver to have on-demand view of the video sources connected to the video signal ports.

(Touchscreen)

In another aspect of the B, the driver interface means is a touchscreen, and the controller determines the video signal input port selected by the driver based on touchscreen commands.

In one case, touching the right-side of the screen denotes driver's selection of one of the video signal input ports connected to a camera on the right-side of the car, and touching the left-side of the screen denotes driver's selection of one of the video signal input ports connected to a camera facing toward rear the car
(Switch)

In yet another aspect of the B, the driver interface means is a switch, and the controller determines the video signal input port selected by the driver based on the position of the switch selected by the driver.

In the first embodiment, the BCSB, on-demand video player allows the driver on-demand view of the back-camera 140. In this embodiment, only a view of one camera is being offered on-demand, therefore, it is not necessary to disconnect the back-camera 140 from the backup camera system 100. However, as we will explain in the next embodiment where views of two cameras are being offered on-demand, the back-camera 140 is disconnected from the port 120 so that the BCSB, on-demand video player can utilize the port 120 for the video signals of both of the cameras.

But the rear gear indicator 150 is removed from the signal input port 130 of the backup camera system 100. Instead, the controller is connected to the signal input port 130. The controller uses the signal input port 130 to take control of the display monitor 110 by sending a rear gear engaged signal to it.

The driver interface means of this embodiment is the driver facing camera. The camera sends a sequence of images to the controller.

In this embodiment, a slight head-move to the right-side denotes driver's desire to view the back-camera 140 view, and slight head move to the left-side denotes driver's desire to terminate the display of the back-camera 140 view.

The controller performs face detection and tracking on the sequence of images it receives from the driver facing camera.

When the controller determines a slight head move to the right-side, it sends a rear gear engaged signal (12 volts) to the signal input port 130 causing the backup camera system 100 to show on the display monitor 110 the view of the back-camera 140. And when the controller determines a slight head move to the left-side, it sends a rear gear disengaged signal (0 volts) to the signal input port 130 causing the backup camera system 100 to stop showing the view of the back-camera 140.

Therefore, the embodiment gives a BCSB, on-demand video player that enables on-demand view of the back-camera 140.

We offer the following disclosures related to selection of a view based on the head/face movements of the driver.
US-20080088624-A1, Long et al.
US-20170282796-A1, Kosaki
U.S. Pat. No. 8,797,263-B2, Kim
US-20020124260-A1, Rivera
US-20090059023-A1, Sasaki
U.S. Pat. No. 8,643,703-B1, Karakotsios et al.
U.S. Pat. No. 9,224,060-B1, Ramaswamy
application Ser. No. 15/854,558, Razmik Karabed
application Ser. No. 15/388,856, Razmik Karabed The controller can employ a processor to perform the face detection. A processor is a hardware that executes a list of commands, which is called software.

In the second embodiment, the BCSB, on-demand video player allows the driver on-demand view of two cameras: the back-camera 140 and a second camera.

In this embodiment, the back-camera 140 is disconnected from the port 120.

The second camera is installed on the right-side mirror of the car such that its view includes the right-side mirror view but it has a wider angle covering the right-side blind area.

The BCSB, on-demand video player uses the multiplexer to direct video signal traffic. Recall, the multiplexer video signal input ports and the video signal ports of the BCSB, on-demand video player are the same.

The multiplexer video signal output port is connected to the input port 120 of the backup camera system 100, and the controller is connected to the control port of the multiplexer.

The back-camera 140 is connected to a first video signal input port of the multiplexer and the second camera is connected to a second video signal input port of the multiplexer.

The rear gear indicator 150 is removed from the signal input port 130 of the backup camera system 100 and in its place the controller is connected to the signal input port 130. The control uses the signal input port 130 to take control of the display monitor 110 by sending a rear gear engaged signal to it.

The driver interface means of this embodiment is the driver facing camera again. The driver facing camera sends a sequence of images to the controller.

In the second embodiment, a slight head move to the right-side denotes the driver's desire to view the second camera view, and a slight head move to the left-side denotes the driver's desire to view the back-camera 140 view.

The controller performs face detection and tracking on the sequence of images it receives from the driver facing camera.

When the controller determines a slight head move to the right-side, it sends a rear gear engaged signal (12 volts) to the signal port 130. And it sends a control signal to the control port of the multiplexer causing the second video signal port to be connected to the video signal output of the multiplexer, channeling the video signal of the second camera to reach the back-camera port 120. Therefore, the backup camera system 100 starts showing the view of the second camera on the display monitor 110.

And when the controller determines a slight head move to the left-side, it sends a rear gear engaged signal (12 volts) to the signal port 130. And it sends a control signal to the control port of the multiplexer causing the first video signal input port to be connected to the video signal output of the multiplexer, channeling the video signal of the back-camera 140 to reach the back-camera port 120. Therefore, the backup camera system 100 starts showing the view of the back-camera on the display monitor 110.

At the start, the controller can force the back-camera 140 view to be shown on the display monitor 110 as above. Then the controller can start monitoring the driver face camera images and change the view according to the driver's demand as above.

We note the rear gear engaged signal (12 volts) to the signal port 130 can be set once at the start of the operation of the B. And it can be changed to the rear gear disengage signal at the end of the operation.

Therefore, the second embodiment describes a BCSB, on-demand video player that enables on-demand view of two cameras.

(Different Driver Interface Means)

Let's consider the second embodiment with other driver interface means.

Microphone: The driver interface means is a microphone, which sends audio signal to controller. The controller performs voice detection on the audio signal to detect voice commands by the driver. The voice commands can be: 'second camera' and 'back camera'.

Touchscreen: The driver interface means is a touchscreen, which sends a signal that contain touchscreen commands. The controller checks the signal for touch screen commands. Touchscreen commands can be: touching the right-side of the screen for the second camera view and touching the left-side of the screen for the back-camera 140 view.

Switch: The driver interface means is a switch, and the controller checks the switch positing settings. A first position is chosen for the first video signal input port of the multiplexer (back-camera 140 view) and a second position is chosen for the second video signal input port (the second camera view).

The third embodiment is very similar to the second embodiment. The main difference is that the video signals are channeled through the controller instead of the multiplexer. Therefore, the video signal ports of the BCSB, on-demand video player are part of the controller.

In this embodiment, the back-camera 140 is disconnected from the port 120. The second camera is installed as before.

The controller has two direct connections to the backup camera system 100. First connection is to the input port 120 of the backup camera system 100. The controller uses this connection to connect the video signal input ports to the input port 120.

And the second connection is to the signal input port 130. But first the rear gear indicator 150 is removed from the signal input port 130 of the backup camera system 100. The control uses the signal input port 130 to take control of the display monitor 110 by sending a rear gear engaged signal to it.

The back-camera 140 is connected to a first video signal input port of the multiplexer and the second camera is connected to a second video signal input port of the multiplexer.

The driver interface means of this embodiment is the driver facing camera again. The driver facing camera sends a sequence of images to the controller.

Again, a slight head move to the right-side denotes the driver's desire to view the second camera view, and a slight head move to the left-side denotes the driver's desire to view the back-camera 140 view.

The controller performs face detection and tracking on the sequence of images it receives from the driver facing camera.

When the controller determines a slight head move to the right-side, it sends a rear gear engaged signal (12 volts) to the signal port 130.

And it connects the second video signal port to the back-camera port 120, causing the second camera signal to reach the port 120. Therefore, the backup camera system 100 starts showing the view of the second camera on the display monitor 110.

In one example, the video signals go through a digital portion of the controller. Here analog portion of the video signal is digitized before entering the digital potion. Further, the controller converts the digitized video signal into a format acceptable to the backup camera system 100 before sending the video signal. Analog and video formats are well described in literature.

By digital we mean steps that operate on discreet values and that generate discrete values, or more specifically by 0's and 1'.

In this example, the video signals are passed through the digital portions so that the controller can do regular video processing (cropping, brightness, contrast, etc.) and video editing (superimposing, adding graphics, etc.)

And when the controller determines a slight head move to the left-side, it sends a rear gear engaged signal (12 volts) to the signal port 130.

And it connects the first video signal port to the back-camera port 120, causing the second camera signal to reach the port 120. Therefore, the backup camera system 100 starts showing the view of the back-camera 140 on the display monitor 110.

Therefore, the third embodiment describes a BCSB, on-demand video player that enables on-demand view of two cameras.

Advantages

In addition to upgrading existing backup camera systems to provide on-demand views, the BCSB, on-demand video player allows the drive to enjoy many of the features of the existing backup system like the radio, the CD player, and GPS while operating the B.

Most existing systems continue running many of their features during backing up. Since we use the back-camera input port, those features are available to the operator of the B.

DETAILED DESCRIPTION OF THE INVENTION

The present invention is described using embodiments. Each embodiment describes various situations and examples where the system of the present invention may be applied. The embodiments are used to describe specific incidents in which the present invention may be useful but is not meant to limit the present invention to such examples.

In the First Embodiment

Many existing backup camera systems offer the back-camera view only when the car is in reverse gear.

In the first embodiment, the BCSB, on-demand video player provides the driver on-demand view of only one camera, the back-camera 140. The BCSB, on-demand video player uses a driver facing camera to interface with a driver. To access the view of the back-camera 140 view, the driver moves her/his head slightly to her/his right. And to stop the access the driver moves her/his head slightly to her/his left.

Figure 2:
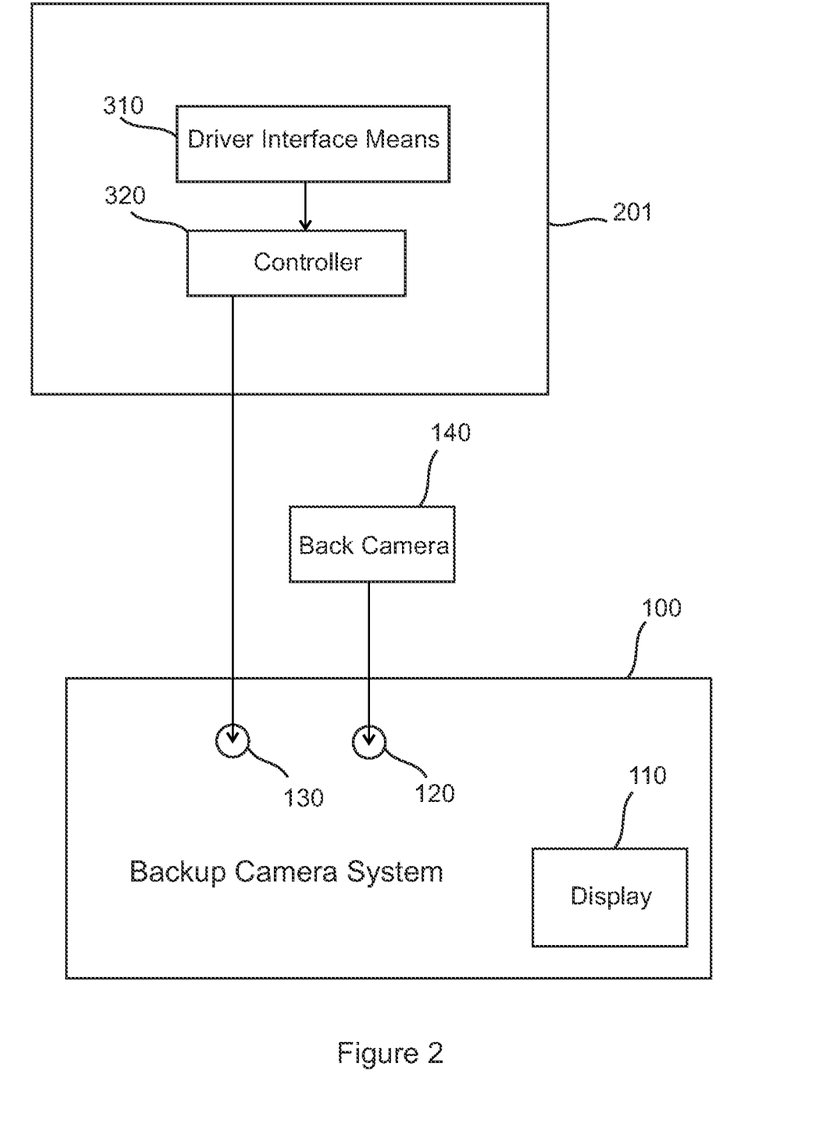
FIG. 2 'BCSB, on-demand Video Player' for a typical backup system, with one on-demand camera view.
Figure 3:
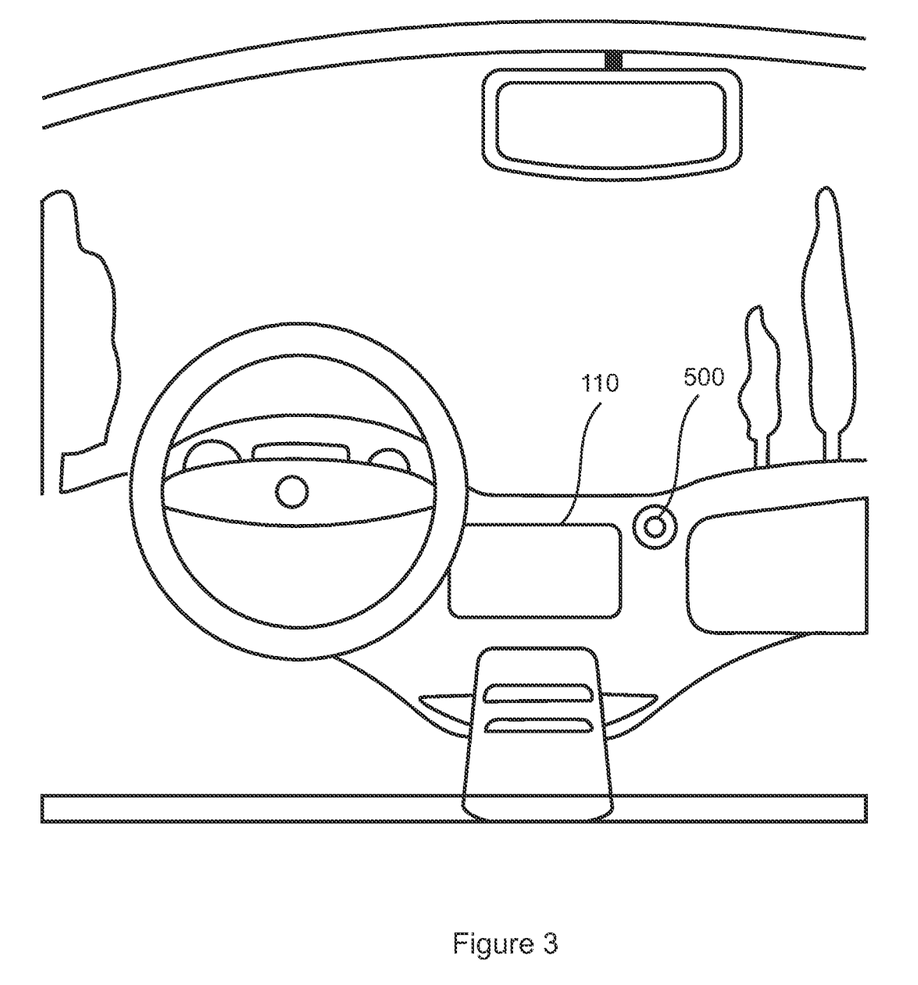
FIG. 3 shows a driver facing camera.
Figure 4A:
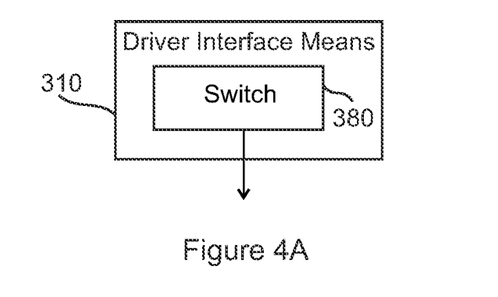
FIG. 4 four different 'driver interface means'.
Figure 4B:
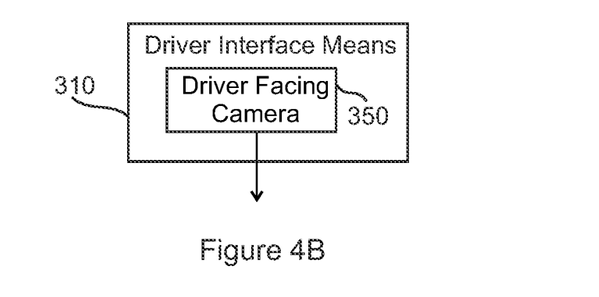
Figure 4C:
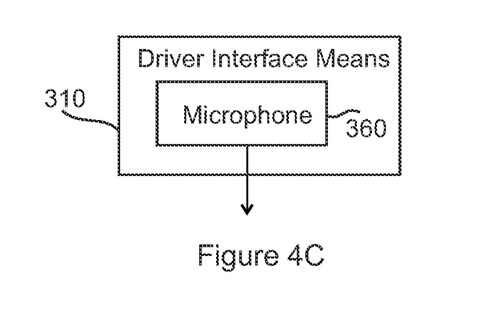
Figure 4D:
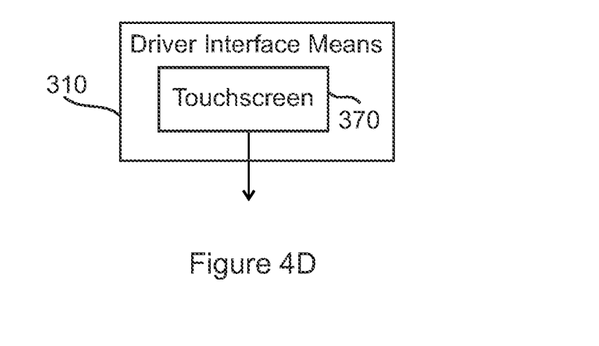

This embodiment is explained using FIGS. 2, 3, and 4.

Referring to FIG. 2, a BCSB, on-demand video player 201 of the first embodiment comprises a controller 320 and driver interface means 310.

Since the BCSB, on-demand video player 201 only provides the back-camera 140 view on-demand, there is no need to disconnect the back-camera 140 from the port 120.

However, the rear gear indicator 150 is removed from the signal input port 130 of the backup camera system 100 and in its place the controller 320 is connected to the signal input port 130. The controller 320 uses the signal input port 130 to take control of the display monitor 110 by sending a rear gear engaged signal to it.

The driver interface means 310 of this embodiment is the driver facing camera 500. The driver facing camera 500 sends a sequence of images to the controller 320.

In the first embodiment, a slight head-move to the right-side denotes driver's desire to view the back-camera 140 view, and slight head move to the left-side denotes driver's desire to terminate the display of the back-camera 140 view.

The controller 320 performs face detection and tracking on the sequence of images it receives from the driver facing camera 500.

When the controller 320 determines a slight head move to the right-side, it sends a rear gear engaged signal (12 volts) to the signal input port 130 causing the backup camera system 100 to show on the display monitor 110 the view of the back-camera 140. And when the controller determines a slight head move to the left-side, it sends a rear gear disengaged signal (0 volts) to the signal input port 130 causing the backup camera system 100 to stop showing the view of the back-camera 140.

Therefore, the BCSB, on-demand video player 201 of the first embodiment enables an on-demand view of the back-camera 140.

The Second Embodiment

In the second embodiment, the BCSB, on-demand video player provides the driver on-demand views of two cameras: the back-camera 140 and a second camera.

The second camera is fixed on the right-side mirror of the car, facing toward back, covering the right-side blind areas.

Further, the BCSB, on-demand video player uses a driver facing camera to interface with a driver.

To access the view of the second camera the driver moves her/his head slightly to her/his right. To switch the view to the back-camera 140 view, the driver moves her/his head slightly to her/his left.

Figure 5:
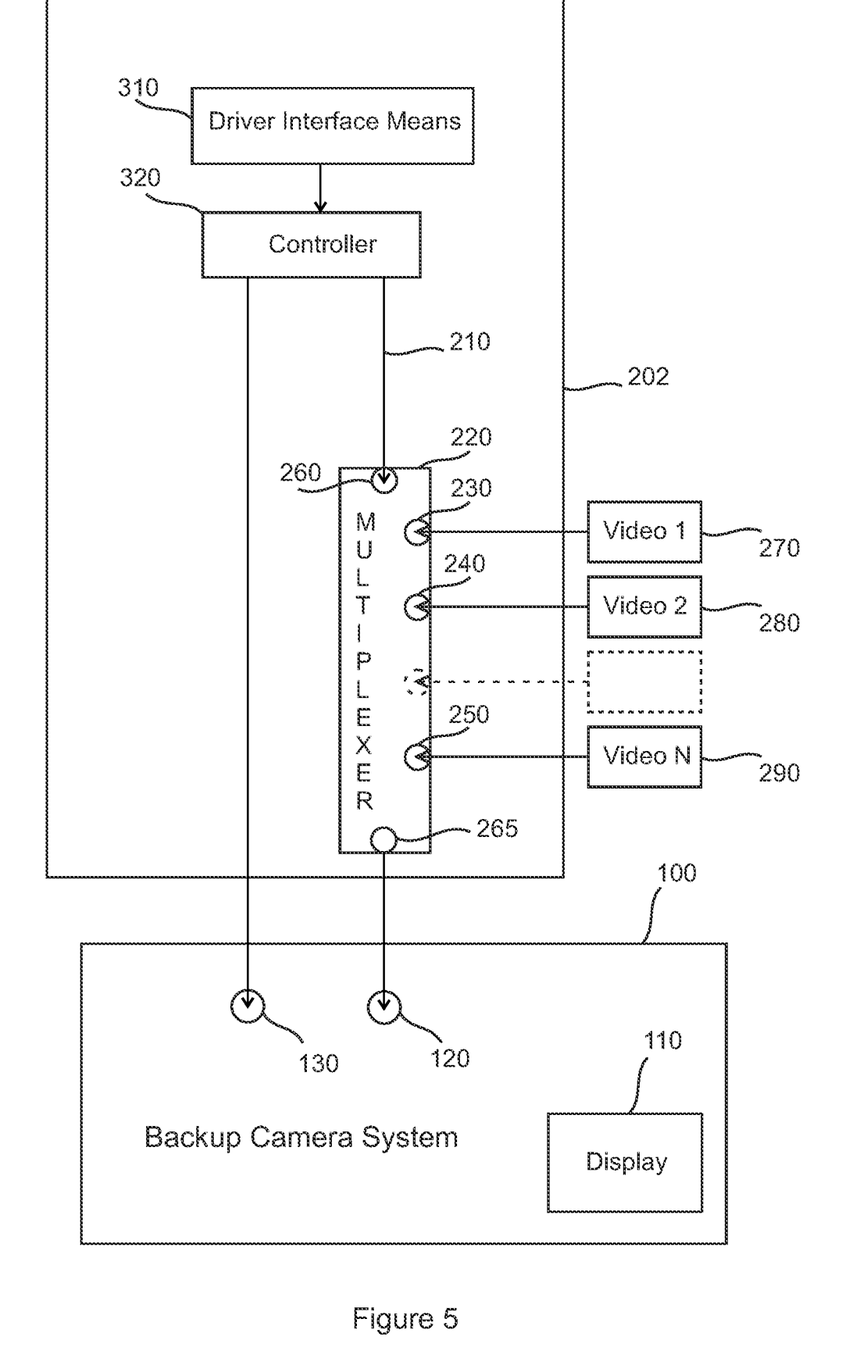
FIG. 5 'BCSB, on-demand Video Player' with multiplexer.

This embodiment is explained using FIGS. 3, 4, and 5.

Referring to FIG. 5, a BCSB, on-demand video player 202 of the second embodiment comprises a controller 320, driver interface means 310, and a multiplexer 220.

The back-camera 140 is disconnected from the port 120.

The rear gear indicator 150 is removed from the signal input port 130 of the backup camera system 100 and in its place the controller 320 is connected to the signal input port 130. The controller 320 uses the signal input port 130 to take control of the display monitor 110 by sending a rear gear engaged signal to it.

The BCSB, on-demand video player 202 uses the multiplexer 220 to direct video signal traffic.

The multiplexer 220 has a plurality of video signal input ports, 270, 280, and 290. It also has a control port 260 and a video signal output port 260.

The video signal output port 265 of the multiplexer 220 is connected to the input port 120 of the backup camera system 100, and the controller 320 is connected to the control port 260 of the multiplexer 220.

A first camera 270 is connected to a first video signal input port 230 of the multiplexer 220 and a second camera 280 is connected to a second video signal input port 240 of the multiplexer 220.

The multiplexer 220 of FIG. 5 has N (a positive integer) video signal input ports. FIG. 5 illustrates a more general situation. Let's restrict our attention to only the first two video signal input ports, 230 and 240.

The back-camera 140 of FIG. 1 and the first camera 270 (called Video 1) are the same.

The second camera 280 is installed on the right-side mirror of the car such that its view includes the right-side mirror view but it has a wider angle covering the right-side blind area.

The driver interface means 310 of this embodiment is the driver facing camera 3 of FIG. 3. The driver facing camera sends a sequence of images to the controller 320.

In the second embodiment, a slight head move to the right-side denotes the driver's desire to view the second camera 280 view, and a slight head move to the left-side denotes the driver's desire to view the first camera 270 (the back-camera 140) view.

The controller 320 performs face detection and tracking on the sequence of images it receives from the driver facing camera 500.

When the controller 320 determines a slight head move to the right-side, it sends a rear gear engaged signal (12 volts) to the signal port 130. And it sends a control signal to the control port 260 of the multiplexer 220 causing the second video signal input port 240 to be connected to the video signal output port 265 of the multiplexer 220, channeling the video signal of the second camera 280 to reach the back-camera port 120. Therefore, the backup camera system 100 starts showing the view of the second camera 280 on the display monitor 110.

And when the controller 320 determines a slight head move to the left-side, it sends the rear gear engaged signal (12 volts) to the signal port 130. And it sends a control signal to the control port 260 of the multiplexer 220 causing the first video signal input port 230 to be connected to the video signal output port 265 of the multiplexer 220, channeling the video signal of the first camera 270 (the back-camera 140) to reach the back-camera port 120. Therefore, the backup camera system 100 starts showing the view of the back-camera on the display monitor 110.

At the start, the controller 220 can force the first camera 230 (the back-camera 140) view to be shown on the display monitor 110 as above. Then the controller 220 can start monitoring the driver facing camera 500 images and change the view according to the driver's demands as above.

We note the rear gear engaged signal (12 volts) to the signal port 130 can be set once at the start of the operation of the BCSB, on-demand video player 202. And it can be changed to a rear gear disengage signal at the end of the operation.

Therefore, the second embodiment describes the BCSB, on-demand video player 202 that enables on-demand view of two cameras.

(different driver interface means) Let's consider the second embodiment, the BCSB, on-demand video player 202, with other driver interface means. We refer to FIG. 4.

Microphone: The driver interface means 310 is a microphone, which sends audio signal to controller. The controller 320 performs voice detection on the audio signal to detect voice commands by the driver. The voice commands can be: 'second camera' and 'back camera'.

Touchscreen: The driver interface means 310 is a touchscreen, which sends a signal that contain touchscreen commands. The controller 320 checks the signal for touch screen commands. Touchscreen commands can be: touching the right-side of the screen for the second camera 280 view and touching the left-side of the screen for the first camera 270 (the back-camera 140) view.

Switch: The driver interface means 310 is a switch, and the controller 320 checks the switch positing settings. A first position is chosen for the first video signal input port 230 of the multiplexer 220 (the second camera which is the back-camera 140 view) and a second position is chosen for the second video signal input port 240 (the second camera view).

The Third Embodiment

The BCSB, on-demand video player of the third embodiment has the same high-level properties as the BCSB, on-demand video player 202.

In the third embodiment, the BCSB, on-demand video player provides the driver on-demand views of two cameras: the back-camera 140 and a second camera. The BCSB, on-demand video player uses a driver facing camera to interface with a driver.

Figure 6:
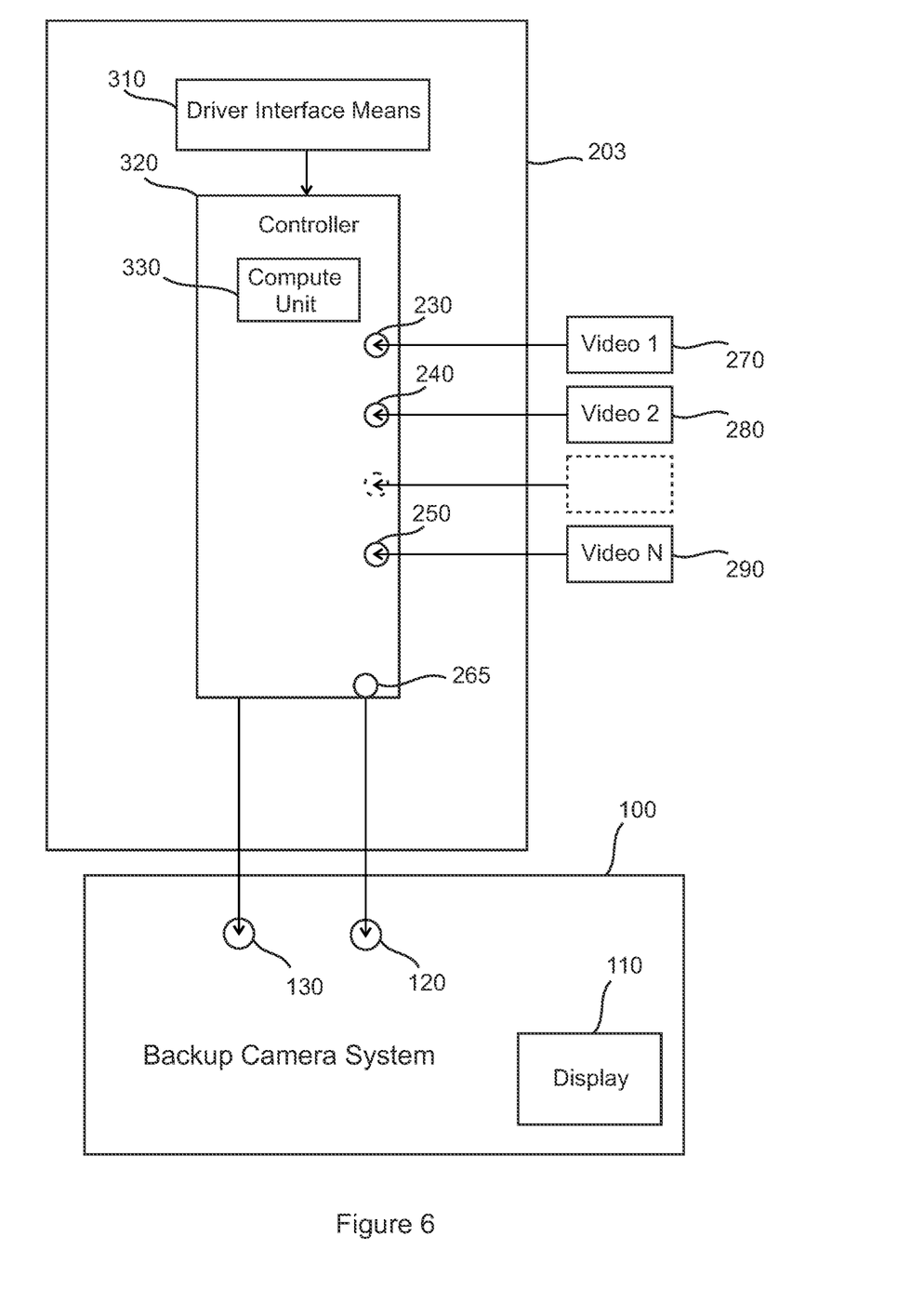
FIG. 6 'BCSB, on-demand Video Player' without multiplexer.

However, the BCSB, on-demand video player of the third embodiment does not use the multiplexer 220. Instead, it has its video signal input ports as part of its controller as described in this embodiment.

The controller here has an internal computational/processing unit that is used for face detection. An advantage of the third embodiment is that the BCSB, on-demand video player is able to use its computational unit for video signal processing and editing.

To access the view of the second camera the driver moves her/his head slightly to her/his right. To switch the view to the back-camera 140 view, the driver moves her/his head slightly to her/his left This embodiment is explained using FIGS. 3, and 6.

Referring to FIG. 6, a BCSB, on-demand video player 203 of the third embodiment comprises a controller 320, a compute unit 330, and driver interface means 310.

The compute unit 330 is the computational unit of the B.

The back-camera 140 is disconnected from the port 120.

The rear gear indicator 150 is removed from the signal input port 130 of the backup camera system 100 and in its place the controller 320 is connected to the signal input port 130. The controller 320 uses the signal input port 130 to take control of the display monitor 110 by sending a rear gear engaged signal to it.

The BCSB, on-demand video player 203 uses the controller 320 to direct video signal traffic.

The controller 320 has a plurality of video signal input ports, 270, 280, and 290. It also has a video signal output port 265.

The video signal output port 265 of the controller 320 is connected to the input port 120 of the backup camera system 100.

A first camera 270 is connected to a first video signal input port 230 of the controller 320 and a second camera 280 is connected to a second video signal input port 240 of the controller 320.

The controller 320 of FIG. 6 has N (a positive integer) video signal input ports. FIG. 6 illustrates a more general situation. Let's restrict our attention again to only the first two video signal input ports, 230 and 240.

The back-camera 140 of FIG. 1 and the first camera 270 (called Video 1) are the same.

The second camera 280 is installed on the right-side mirror of the car such that its view includes the right-side mirror view but it has a wider angle covering the right-side blind area.

The driver interface means 310 of this embodiment is the driver facing camera 3 of FIG. 3. The driver facing camera sends a sequence of images to the controller 320.

In the third embodiment, a slight head move to the right-side denotes the driver's desire to view the second camera 280 view, and a slight head move to the left-side denotes the driver's desire to view the first camera 270 (the back-camera 140) view.

The controller 320 performs face detection and tracking on the sequence of images it receives from the driver facing camera 500.

When the controller 320 determines a slight head move to the right-side, it sends a rear gear engaged signal (12 volts) to the signal port 130.

And it connects the second video signal input port 240 to the video signal output port 265 of the controller 320, channeling the video signal of the second camera 280 to reach the back-camera port 120. Therefore, the backup camera system 100 starts showing the view of the second camera 280 on the display monitor 110.

And when the controller 320 determines a slight head move to the left-side, it sends the rear gear engaged signal (12 volts) to the signal port 130.

And it connects the first video signal input port 230 to the video signal output port 265 of the controller 320, channeling the video signal of the first camera 270 (the back-camera 140) to reach the back-camera port 120. Therefore, the backup camera system 100 starts showing the view of the first camera 270 on the display monitor 110.

Therefore, the third embodiment describes the BCSB, on-demand video player 203 that enables on-demand view of two cameras.

As explained earlier, the BCSB, on-demand video player 203 is able to perform video processing (at least one of: cropping, adjusting brightness, adjusting contrast, applying image frame stabilization, etc.) and video editing (at least one of: superimposing video signals, adding graphics to video signals, etc.) using the compute unit 330.

We Remark:

6.1) For night operation of the b, we recommend night vision capability for the driver facing camera and use of infrared light emitting diodes.

6.2) The invention has been demonstrated for on-demand functionality of one and two cameras. Nevertheless, the invention is not limited to two cameras.

6.3) In the third embodiment, a useful video signal editing operation is to add a red frame to the video signal when the face detection algorithm does not detect the driver, to alert the driver of the need to adjust the driver facing camera angle.

6.4) In order to release control of the display monitor 110 to the backup camera system 100, an on/off switch can easily be added to the b. This will allow the driver to enjoy features of the backup camera system that become disabled during backing up.

6.5) We use D-right to denote the amount of the head movement to the right necessary to cause a change of view, and D-left to denote the amount of the head movement to the left necessary to cause a change of view. D-right and D-left can be measured distances in the image. (Please see the cited patents.)

We suggest two variations to the embodiments.

a) The thresholds D-right and D-left can be different.

The motivations is that one driver may prefer D-right>D-left and another driver may prefer D-right<D-left. We can add a user interface (knob, button, touchscreen) that will enable the driver adjust these amounts to fit her/his preferences.

b) In the second and third embodiments, a head/face movement greater than D-left toward the left-side changes the view of the display monitor 110 from the view of the second camera 280 to the view of the back-camera 140. In this variation, the change of view does not occur immediately. The variation b) delays the change by T seconds (T=5 seconds).

The motivation is that we don't want accidental head movements to the left to change the view quickly. In this variation, the display shows at least T seconds uninterrupted view of the second camera.

6.6) In order to display the back-camera 140 view on the display monitor 110 when the car is in reverse, the following feature can be added to the variation b). The reverse gear indicator 150 is connected to the controller 320. And the controller 320 is configured to forces the back-camera view when the reverse gear indicator 150 indicates that the car is in reverse. In other words, the controller 320 overrides the driver's demands for as long as the car is in reverse gear, and sends the back-camera 140 view for display.

6.7) We have used the term port to denote a terminal connecting a device or a unit to an external unit. A port accommodates all the lines necessary to receive or transmit a signal. If a video signals uses two lines to transmit, then the video signal port has two lines. However, if one of the lines is ground, then the video port can have only one line if the units already are sharing a ground.

6.8) As far as related to this disclosure, the terms a camera, an image sensor, a video source, are interchangeable.

6.9) A video sources or cameras mentioned in this disclosure can be one located on the exterior of the car or the interior of the car. And its connection to a video port can be with wire or wireless. The video source can be at a different location than the car and can be connected by wireless technology, for example Bluetooth, Wi-Fi, etc.

6.10) The B according to this disclosure are equally applicable to trucks and other vehicles.

6.11 When the driver interface means is the driver facing camera, many members of the driver's body can be detected and tracked by a body member detection and tracking algorithm. These members include face and facial parts, hands, arms, etc. The visual codebook can include movements of the detectable body members of the driver, as well as gestures made by the detectable body members.

What we claim is:

1. An on-demand video player, comprising:
a controller connected to a reverse gear port of a backup camera system of a vehicle, the backup camera system comprising a display monitor, a back-camera input port, and a reverse gear port;
the controller comprising a plurality of video signal input ports, each video signal input port connected to a camera in a plurality of cameras comprising a backup camera of the vehicle; and
a driver facing camera;
wherein the controller:
performs detection and tracking of one or more body members of a person comprising at least one of a hand and an arm, on a sequence of images produced by the driver facing camera;
determines a video signal input port connected to a camera selected by the person based on the movements of the one or more body members of the person in the sequence of images;
makes a connection between the video signal input port connected to the selected camera and the back-camera input port of the backup camera system of the vehicle; and
sends a reverse gear engaged signal to the reverse gear port of the backup camera system of the vehicle causing a video signal from the selected camera to be displayed on the display monitor of the backup camera system of the vehicle.

2. The on-demand video player of claim 1, wherein the controller further comprises a processor that performs face detection and tracking on a sequence of images produced by the driver facing camera.

3. The on-demand video player of claim 1 further comprising a switch that releases control of the display monitor to the backup camera system of the vehicle.

4. An on-demand video player, comprising:
a controller connected to:
a reverse gear port of a backup camera system of a vehicle, the backup camera system of the vehicle comprising a display monitor, a back-camera input port, and a reverse gear port; and
a multiplexer comprising a plurality of video signal input ports, an output port, and a control port, wherein each video signal input port is connected to a camera in a plurality of cameras comprising a backup camera of the vehicle, wherein the output port of the multiplexer is connected to the back-camera input port of the backup camera system of the vehicle, wherein the control port of the multiplexer is connected to the controller;
wherein the controller:
receives a selection of a camera in the plurality of cameras;
determines the video signal input port connected to the selected camera;
sends a control signal to the control port of the multiplexer causing the multiplexer to make a connection between the video signal input port connected to the selected camera and the back-camera input port of the backup camera system of the vehicle; and
sends a reverse gear engaged signal to the reverse gear port of the backup camera system of the vehicle causing a video signal from the selected camera to be displayed on the display monitor of the backup camera system of the vehicle.

5. The on-demand video player of claim 4 further comprising a switch having a plurality of switch positions, each of the switch positions corresponding to a video signal input port in the plurality of video signal input ports,
wherein the controller:
receives the switch position, and
determines the selected video signal input port based on a switch position selected by a person.

6. The on-demand video player of claim 4 further comprising a driver facing camera,
wherein the controller further comprises a processor that performs face detection and tracking on a sequence of images produced by the driver facing camera, and
wherein the controller determines the video signal input port selected by a person based on the movements of at least one of a face and a body member of the person in the sequence of images.

7. The on-demand video player of claim 4 further comprising a microphone,
   wherein the controller performs voice recognition on audio signals produced by the microphone, and
   wherein the controller determines the video signal input port selected by a person based on the voice commands.

8. The on-demand video player of claim 4 further comprising a touchscreen, and
   wherein the controller determines the video signal input port selected by a person based on touch screen commands.

9. The on-demand video player of claim 4 further comprising a driver facing camera,
   wherein the controller performs detection and tracking of one or more body members comprising at least one of a hand and an arm, on a sequence of images produced by the driver facing camera, and
   wherein the controller determines the video signal input port selected by a person based on the movements of the one or more body members of the person in the sequence of images.

10. The on-demand video player of claim 4 further comprising a switch that releases control of the display monitor to the backup camera system of the vehicle.

* * * * *